Sept. 13, 1938. R. D. ACTON 2,129,724
TRACTOR CONSTRUCTION
Filed Feb. 26, 1937 2 Sheets-Sheet 2
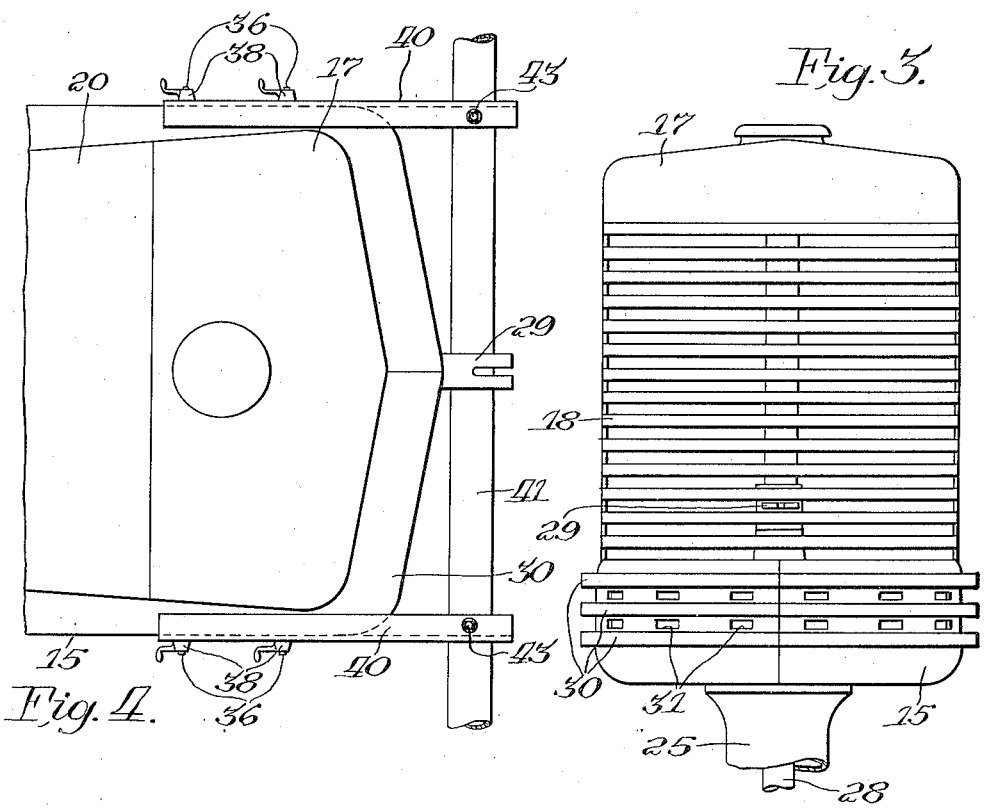
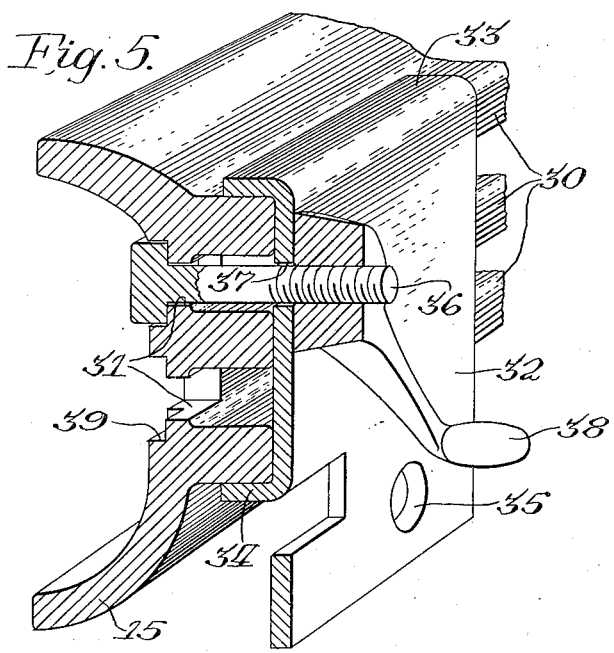
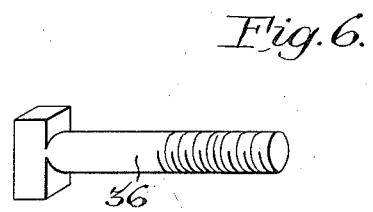
Inventor
Russel D. Acton Patented Sept. 13, 1938

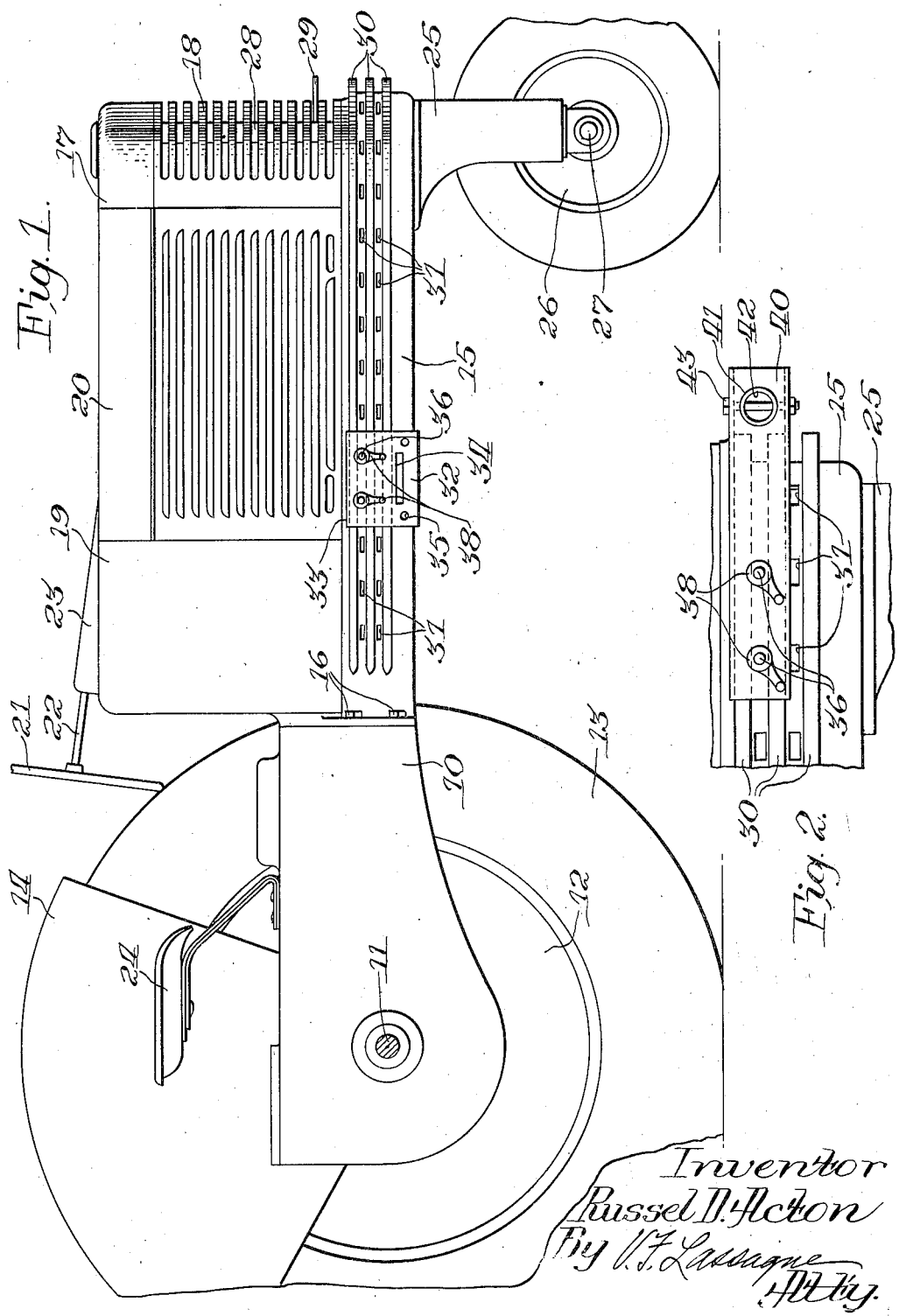

2,129,724

UNITED STATES PATENT OFFICE 2,129,724

TRACTOR CONSTRUCTION

Russel D. Acton, Chicago, Ill., assignor to International Harvester Company, a corporation of New Jersey Application February 26, 1937, Serial No. 127,847

7 Claims. (Cl. 97—232)

This invention relates to tractor construction. More particularly it relates to a frame construction for a tractor and to the provision of means on the frame for attaching implement supporting means at various locations thereon.

The principal object of the invention is to provide in a tractor having an improved appearance a frame structure having means thereon to provide for mounting implement attaching brackets at any location along the sides of the tractor or across the front thereof.

Another object is to construct a frame of the desired strength by utilizing longitudinally extending ribs as structural elements and simultaneously as means for improving the appearance of the tractor and improving its utility by forming means for readily attaching implements or implement supporting means.

Another object is to provide a series of spaced slots along the side of the tractor frame, through which headed securing bolts may be inserted from the outside, said frame being provided interiorly with means to hold the bolts against rotation while implement securing means are attached by the bolts.

The above objects and others which will be apparent from the detailed description to follow are accomplished by a frame construction in which vertically spaced ribs are provided along the sides of the frame and around the front thereof. Spaced openings are formed in the frame between the ribs. The openings are preferably formed as slots, through which suitable headed securing means may be inserted and moved or rotated to engage the interior of the frame whereby implement supporting brackets may be clamped in position.

By utilizing a headed bolt, which can be inserted through a slot, a quick attachable bracket can be utilized, as it is not necessary to completely remove the bolt from the bracket or other part being attached. In order to facilitate the attaching and removing of brackets, wing nuts or nuts with cranks may be utilized.

In the drawings:

Figure 1 is a side elevation of a tractor embodying the invention with one of the rear wheels removed better to show the tractor construction;

Figure 2 is an enlarged side elevation showing a portion of the front end of the tractor and a bracket attached thereto for supporting a cross member at the front of the tractor;

Figure 3 is a front end elevation of the tractor shown in Figure 1;

Figure 4 is a plan view of the front end of the tractor shown in Figure 1 with a bar supported at the front by brackets, as illustrated in Figure 2;

Figure 5 is a perspective with a portion cut away by a transverse vertical section, showing an implement attaching bracket, as illustrated in Figure 1; and, Figure 6 is a perspective view of a securing bolt as utilized in an attaching bracket, as shown in Figure 5.

In the drawings an agricultural tractor of the general purpose type has been illustrated. Said tractor is made of a cast frame structure formed in two separate units. The transmission and differential housing 10 comprising the rear unit is formed as a single casting. Axles 11 extending from the housing provide means for mounting wheels 12, which are shown with pneumatic tires 13. A fender 14 is also illustrated in Figure 1. The main frame 15 which forms the forward unit of the tractor is secured to the transmission and differential housing 10 by suitable means such as the cap screw 16 illustrated. These parts of the structure have been shown only in outline, as the invention resides in the particular ribbed and slot formation of the main frame 15.

A conventional radiator is mounted on the frame, the top header 17 of which is shown, as well as a slotted shell 18, which extends around the radiator core and forwardly thereof to form a false front shielding the parts within the shell and adding to the appearance of the tractor. A sheet metal housing 19 is shown mounted at the rear of the frame 15, within which the gasoline tank and other associated parts are mounted. A sheet metal hood 20 connects the housing 19 with the upper header 17 of the radiator. A steering wheel 21 is illustrated with the shaft 22 thereof extending through a raised portion 23 on the housing 19. An operator's seat 24 is illustrated as being mounted on a suitable support on the transmission and differential housing 10.

At the forward end of the main frame 15 a downwardly extending steering post support 25 beneath the frame is mounted and secured thereto by any suitable means not illustrated. Pneumatic tired wheels 26 are mounted on stub axles 27 secured to the steering post 28. Said steering post extends upwardly through the support 25 to the top of the radiator shell 18. Suitable steering gear, not shown, is provided for connecting the steering shaft 22 to the steering post 28. This type of construction is in wide use at the present time in tractors of this type, and has not been illustrated in detail.

It will be noted that the slots formed in the radiator shell 18 are horizontal and extend across the front of the shell and around the sides thereof. A shifting arm 29 for use with tractor attached implements, such as shifting cultivators, is rigidly attached to the steering post 28. Said arm extends forwardly through one of the slots formed in the shell 18.

It will be noted that a center line has been shown at the front of the main frame 15, to indicate that said frame is cast in two sections. The frame may be cast in one piece, if desirable, or in two sections, as indicated, depending upon the amount of coring and the foundry practice.

Three spaced ribs 30 are formed integrally on the cast frame 15 spaced vertically from each other a distance substantially equivalent to their width. These ribs extend outwardly from the main frame along each side thereof a substantial distance to form ledges for the implement attaching brackets and to give the frame rigidity and strength. The ribs also serve to give the tractor a pleasing and attractive appearance. The ribs 30 extend, as illustrated, from adjacent the rear of the main frame 15 to the front thereof and across the front. The radiator shell and the main frame have been illustrated as pointed somewhat, for the sake of appearance. It is to be understood that the ribs may extend in a straight line across the front, if it is found desirable to have straight ribs for attaching bars or other implement supporting means across the front of the tractor. Although three ribs have been illustrated, two ribs would serve the same purpose, and under some conditions more than three might be utilized. The exact proportion of the ribs in width and thickness is not important, the same depending entirely upon the strength desired in the ribs and the purpose for which it is to be used. To accomplish the principal object of the invention, it is only necessary to have, at least, two ribs spaced apart from each other.

Slots 31 are formed in the main frame between the ribs spaced along the entire extent of the ribs alongside the tractor and across the front thereof. The purpose of these slots is to provide means for attaching implements or implement supporting brackets at any point. In actual practice, it has been found that various implements must be attached at different locations to properly position them with respect to the front or rear wheels of the tractor, or with respect to other parts of the tractor. By providing openings as illustrated, the entire body of the tractor is accessible for attaching implements.

Two types of implement attaching brackets have been illustrated. The bracket 32, shown in Figures 1 and 5, is formed of a metal plate with a horizontal flange 33 bent over to engage the upper surface of the upper rib. The plate extends a substantial distance downwardly below the lower rib and is provided with a punched out portion 34 forming a flange for engaging the lower side of the lower rib. A pair of openings 35 is shown in the lower portion of the plate, by which tools or implements may be attached.

To secure the plate 32 on the frame, T-headed bolts 36 extending through openings 37 in the plate are provided with crank nuts 38. To apply the bracket to the frame the flange 33 and the bent out portion 34 are slipped over the ribs at the desired location along the tractor body. The T-headed bolts 36 are then loosened sufficiently to be pushed through the proper slots 31. The bolts are then turned to engage depressions 39 formed on the interior of the frame adjacent the slots 31 at right angles thereto. The bolts are thereby held against turning while the nuts are tightened by means of the cranks provided thereon.

For many uses it may be necessary to use only one bolt for attaching a bracket. Most of the strain exerted on the plate 32 is transmitted by the flanges to the ribs and is not carried directly by the bolt. It is to be understood that other types of bolts may be utilized. For some installations, hook bolts may be used, which, after insertion into the slots, may be moved longitudinally of the frame to engage a portion of the frame casting. Square headed bolts may also be utilized, if desired, where the interior of the frame may be reached for inserting the bolt into position. It is, however, desirable to use a bolt which can be inserted through the slot, as such bolts may remain with the attaching bracket when removed to be available when the bracket is again secured in position. This is an important feature, as a great deal of emphasis is being put upon the quick attachable feature of mounting implements on tractors.

Another type of attaching bracket has been illustrated in Figures 2 and 4. Channel bars 40 are shown as being positioned over the forward ends of ribs at opposite sides of the tractor with the wings of the channel engaging the outside surfaces of two of the ribs 30. Two bolts 36, identical with those used in the other form of bracket, secure the channels in position by the quickly attachable crank nuts 38. A transverse pipe 41 is shown across the front of the tractor, being carried in openings 42 formed in the forward ends of the channels 40. Bolts 43 are shown for securing the pipe in position against transverse movement.

The use of the ribs as formed in accordance with this invention on a tractor frame has been explained in connection with the above description. The application of two types of implement supporting brackets has also been described. It is to be noted that the invention resides broadly in the provision of the spaced ribs as one important feature and in the provision of spaced series of slots as another feature of the invention. Each of these features forms a function of its own and the two cooperate to provide an additional function, that is, the rigid mounting of implements or implement attaching brackets on the frame structure of a tractor.

It is to be understood that applicant has shown and described only a preferred embodiment of his improved tractor construction and that he claims all modifications falling within the scope of the appended claims.

What is claimed is:

1. In combination, a tractor main frame adapted to carry directly attached implements along the sides thereof, said frame being formed with a plurality of vertically spaced substantially parallel longitudinally extending bracket engaging portions, said frame being further formed with a plurality of longitudinally spaced slots located between said portions, an implement supporting bracket provided with extensions formed to engage said portions to hold the bracket against turning and against vertical displacement with respect to the frame, a securing element removable with the bracket, said element being provided with a portion insertable through one of the slots from the outside thereof, said portion being engageable with a portion of the interior of the frame to hold the element against withdrawal after being brought into engaging position, and means to adjust the element to rigidly secure the bracket to the frame.

2. In a tractor, the combination of a narrow main frame adapted to carry directly attached implements along the sides thereof, said frame being formed with a plurality of vertically spaced substantially parallel longitudinally extending bracket engaging portions, said portions extending along each side to the front and entirely around the front, said frame being further formed with a plurality of longitudinally spaced slots located between said portions, an implement supporting bracket provided with extensions formed to engage said portions to hold the bracket against turning and against vertical displacement with respect to the frame, a securing element removable with the bracket, said element being provided with a portion insertable through one of the slots from the outside thereof, said portion being engageable with a portion of the interior of the frame to hold the element against withdrawal after being brought into engaging position, and means to adjust the element to rigidly secure the bracket to the frame.

3. In a tractor having a narrow main frame adapted to carry directly attached implements along the sides thereof, and, in combination therewith, a plurality of vertically spaced outwardly and longitudinally extending reenforcing and implement attaching ribs on the main frame, said frame being formed with a plurality of longitudinally spaced openings located between the ribs, an implement supporting bracket provided with portions formed to engage the ribs to hold the bracket against turning and against vertical displacement with respect to the frame, a securing element insertable through one of the openings and adjustably engageable with the bracket for securing said bracket in any one of a plurality of positions alongside the main frame.

4. In a tractor having a narrow main frame adapted to carry directly attached implements along the sides thereof, and, in combination therewith, a plurality of vertically spaced outwardly and longitudinally extending reenforcing and implement attaching ribs on the main frame, said ribs extending along each side and entirely around the front of the frame, said frame being formed with a plurality of longitudinally spaced openings located between the ribs, an implement supporting bracket provided with portions formed to engage the ribs to hold the bracket against turning and against vertical displacement with respect to the frame, a securing element insertable through one of the openings and adjustably engageable with the bracket for securing said bracket in any one of a plurality of positions alongside the main frame.

5. In a tractor having a narrow main frame adapted to carry directly attached implements along the sides thereof, and, in combination therewith, a plurality of vertically spaced longitudinally extending ribs on the main frame, said frame being formed with a plurality of longitudinally spaced slots located between the ribs, an implement supporting bracket provided with portions formed to engage the ribs to hold the bracket against turning and against vertical displacement with respect to the frame, a securing element removable with the bracket and adjustable with respect thereto, said element being provided with a portion insertable through one of the slots from the outside thereof, said portion being engageable with a portion of the interior of the frame to hold the element against withdrawal after being brought into engaging position.

6. In a tractor having a sectional frame including a rear unit and a cast forward unit forming a narrow main frame secured at its rear end to the forward end of the rear unit, and, in combination therewith, a plurality of vertically spaced longitudinally extending reenforcing and implement mounting ribs cast integral with the main frame and extending substantially the entire length thereof, said frame being formed with a plurality of longitudinally spaced slots located between the ribs, an implement supporting bracket provided with portions formed to engage the ribs to hold the bracket against turning and against vertical displacement, a securing element removable with the bracket, said element being provided with a portion insertable through one of the slots from the outside thereof, said frame being formed with cast-in pockets adjacent the slots in which said portion is engageable to hold the element against withdrawal and against turning after being brought into engaging position, and means for adjusting said element to secure the bracket rigidly to the frame.

7. In a tractor having a sectional frame including a rear and a forward unit forming a narrow cast main frame, and, in combination therewith, a plurality of vertically spaced longitudinally extending ribs rigid with the main frame and extending substantially the entire length thereof, said frame being formed with a plurality of longitudinally spaced slots located between the ribs, an implement supporting bracket provided with portions formed to engage the ribs to hold the bracket against turning and against vertical displacement, a securing element removable with the bracket and adjustable with respect thereto, said element being provided with a portion insertable through one of the slots from the outside thereof, said portion being engageable with a portion of the interior of the frame to hold the element against withdrawal after being turned into engaging position and said frame being provided with means to hold the element against rotation after engagement with the interior of the frame during adjusting thereof to secure the bracket in fixed position on the frame.

RUSSEL D. ACTON.